United States Patent [19]

Carmichael

[11] 4,313,535
[45] Feb. 2, 1982

[54] EXCITED FRAME, VIBRATORY CONVEYING APPARATUS FOR MOVING PARTICULATE MATERIAL

[75] Inventor: Dumont M. Carmichael, Milton-Freewater, Oreg.

[73] Assignee: Applied Magnetics Corporation, Goleta, Calif.

[21] Appl. No.: 48,728

[22] Filed: Jun. 15, 1979

[51] Int. Cl.³ ............... B65G 27/16; B65G 27/08
[52] U.S. Cl. ................................. 198/766; 198/763
[58] Field of Search .................. 198/763, 766, 770

[56] References Cited

U.S. PATENT DOCUMENTS

| | | | |
|---|---|---|---|
| 29,512 | 1/1878 | Musschoot | 198/770 |
| 2,951,581 | 9/1960 | Long et al. | |
| 3,032,175 | 5/1962 | Thomas | 198/763 |
| 3,208,292 | 9/1965 | Austin et al. | 198/770 |
| 3,380,572 | 4/1968 | Luger | 198/763 |
| 3,447,671 | 6/1969 | Schweinfurth | 198/763 |
| 3,648,862 | 3/1972 | Sugimoto | 198/766 |
| 4,218,929 | 8/1980 | Spurlin | 198/770 |

Primary Examiner—Joseph E. Valenza
Assistant Examiner—Brian M. Bond
Attorney, Agent, or Firm—Wells, St. John & Roberts

[57] ABSTRACT

An excited frame, vibratory conveying apparatus is described for efficiently conveying particulate material. The apparatus has an elongated conveying member mounted by beam springs on an excited frame means. The excited frame means has a balanced vibratory drive means for vibrating the excited frame along a line of force that passes through the center of mass of the apparatus and preferably through the center of masses of conveying member and the excited frame means. The ratio of the weight of the conveying member to the weight of the excited frame means should be between 1.5 and 3.5 and preferably between 2.5 and 3.5. Such an arrangement provides for minimum transmission of vibration both horizontal and vertical into the stationary supporting structure and further minimizes rocking motion.

5 Claims, 7 Drawing Figures

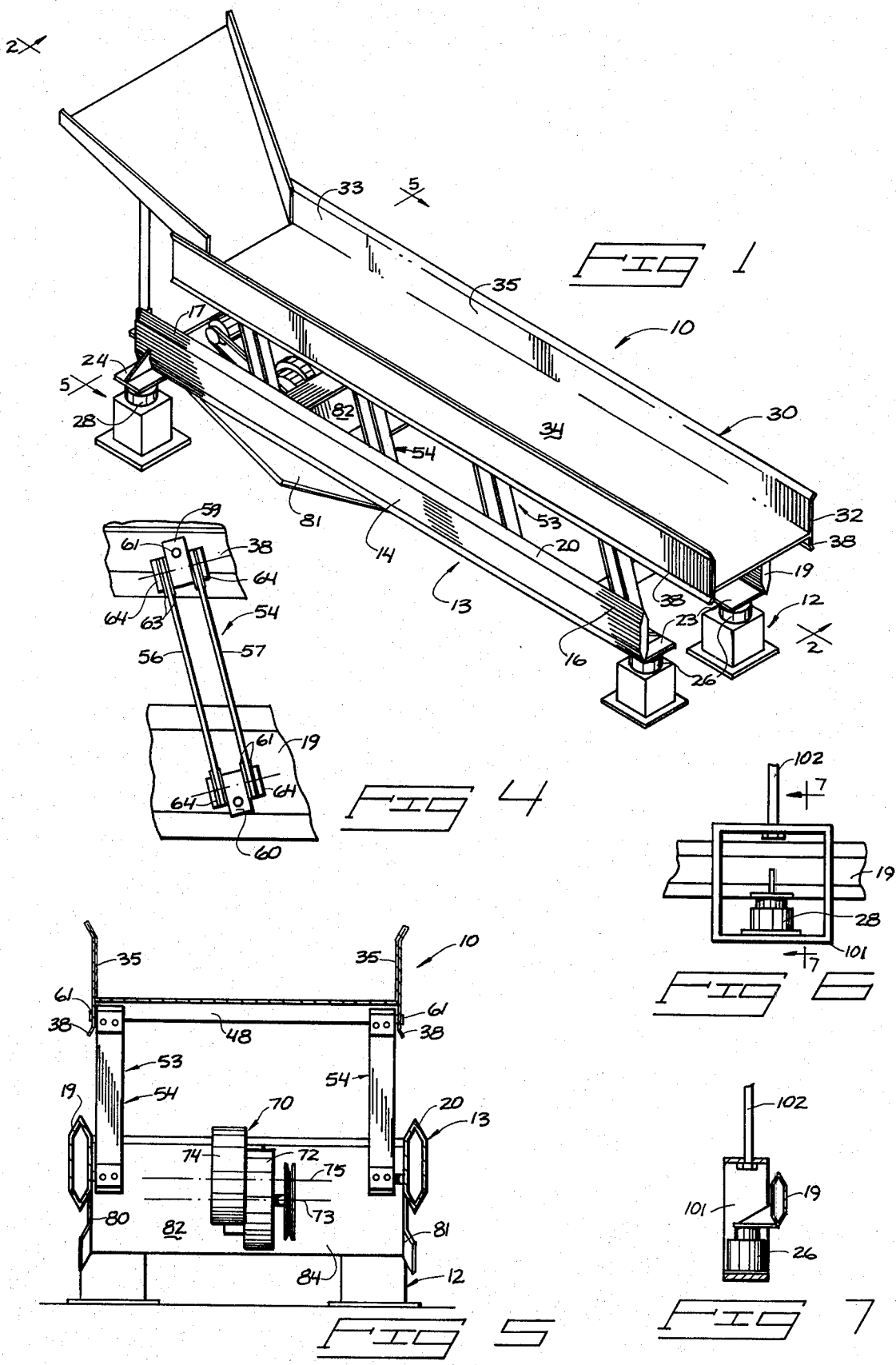

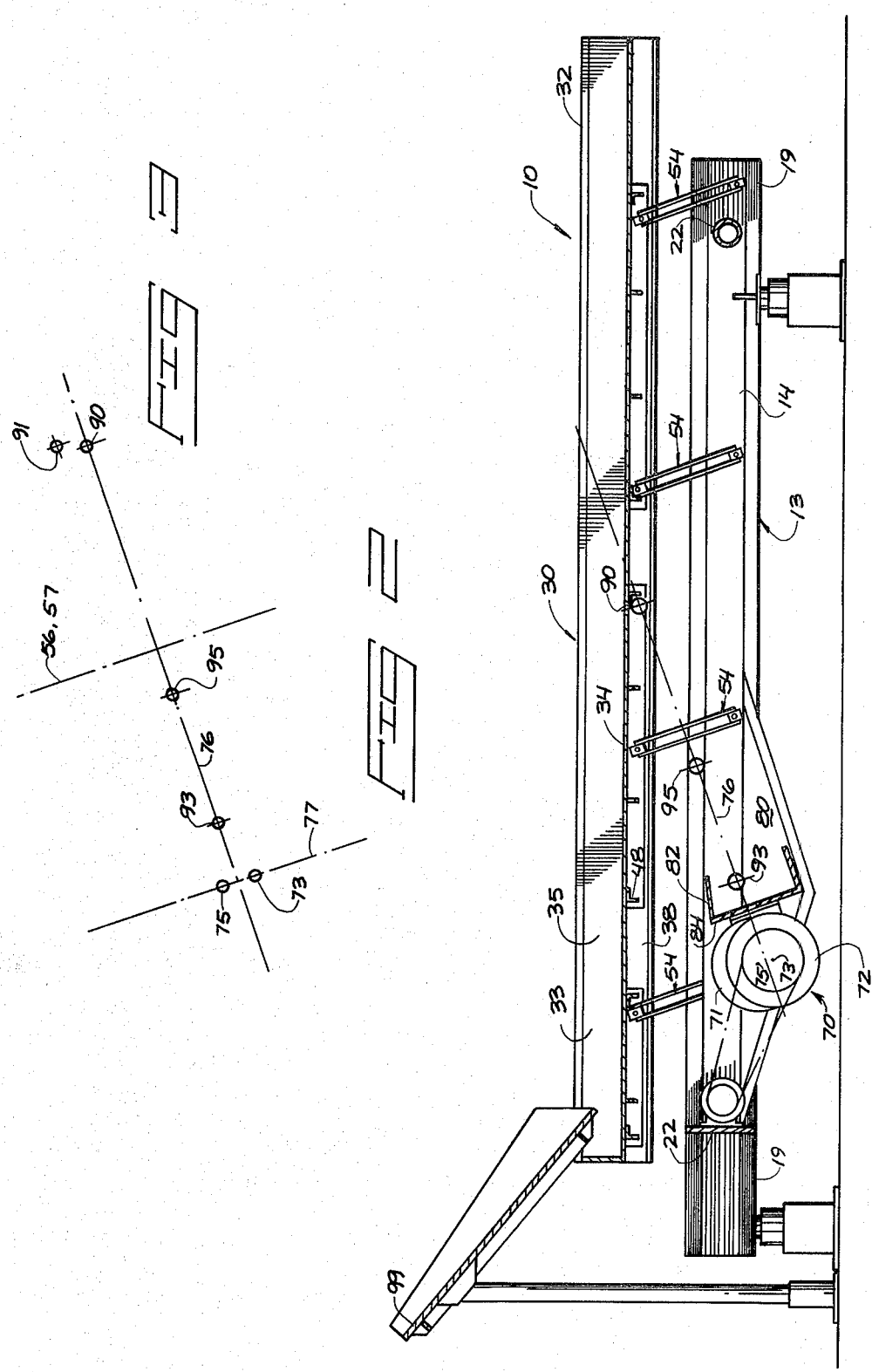

EXCITED FRAME, VIBRATORY CONVEYING APPARATUS FOR MOVING PARTICULATE MATERIAL

BACKGROUND OF THE INVENTION

This invention relates to excited frame vibratory conveying apparatus for conveying particulate material.

In most vibratory conveying systems, the vibratory drive is connected directly to the conveying frame or bed. Some experimentation has been conducted in which the vibratory device is connected to a support frame in which the support frame is excited or primarily vibrated with the vibration being transferred through springs indirectly to the conveying member or bed. Such systems have been referred to in the past as two mass, two spring vibratory conveyor systems or excited frame vibratory systems. Such past attempts have been described in the Long et al U.S. Pats. Nos. 2,876,891, and 2,951,581 granted Mar. 10, 1959 and Sept. 6, 1970 respectively. Additionally the Luger U.S. Pat. No. 3,380,572 granted Apr. 30, 1968 describes a similar system. The basic objective is to design such a system in which the vibration amplitude of the excited frame approaches zero while the conveyor bed or member is vibrated at its natural frequency of maximum amplitude. The principal variables are the rpm of the vibratory drive member, the spring constant of the support springs supporting the conveyor bed on the excited frame, the weight of the conveyor bed, the weight of the product or load being conveyed and the weight of the excited frame. The generally recognized advantages of such a system over conventional direct vibratory conveyors is that it is possible under some conditions to transfer less vibration into the floor or ceiling supports and to provide a conveyor that is considerably less massive than the direct drive vibrating systems.

However, one of the principal problems associated with excited frame vibratory conveyors involves vertical rocking of the conveying member and the transmission of substantial vertical forces into the stationary supporting structure. Long et al in U.S. Pat. No. 2,951,581 contends that such rocking problems may be solved by utilizing substantially vertical leaf or beam springs between the stationary supporting structure and the excited frame. Long et al contends that soft or coil springs that "float" the system are unsatisfactory and do not provide the proper vertical rigidity required to prevent rocking.

One of the principal objects and advantages of this invention is to provide a greatly improved excited frame, vibratory conveyor apparatus utilizing a "floating" suspension resilient support system in which the rocking or eccentric forces are greatly reduced.

A further object of this invention is to provide a greatly improved "excited frame" vibratory conveyor apparatus that is capable of operating over a rather large range of loading without adversely affecting its operation.

A further object of this invention is to provide an improved excited frame, vibratory conveying apparatus that is very simple in structure and economical in manufacture to enable the apparatus to enjoy a wide usage for conveying various particulate material.

These and other objects and advantages of this invention will become apparent upon reading the following detailed description of a preferred embodiment.

BRIEF DESCRIPTION OF THE DRAWINGS

Preferred and alternate embodiments of this invention are illustrated in the accompanying drawings, in which:

FIG. 1 is an isometric view of the excited frame, vibratory conveying apparatus that is the subject of this invention;

FIG. 2 is a vertical cross sectional view taken along line 2—2 in FIG. 1;

FIG. 3 is a schematic view of the relationship between the line of vibratory force with respect to centers of masses of several components;

FIG. 4 is an enlarged fragmentary side elevational view of a beam spring assembly utilized to support a conveyor member on an excited frame;

FIG. 5 is a vertical transverse cross sectional view taken along line 5—5 in FIG. 1;

FIG. 6 is a fragmentary side elevational view of the alternate system for supporting the conveyance system from an overhead support structure as opposed to a floor mounted system illustrated in FIGS. 1 and 2; and FIG. 7 is a vertical cross sectional view taken along line 7—7 in FIG. 6.

DETAILED DESCRIPTION OF A PREFERRED AND ALTERNATE EMBODIMENT

Referring now to the drawings, there is illustrated in FIG. 1 an excited frame, vibratory conveying apparatus generally designated with the numeral 10 that is supported on a base or stationary support 12. In FIG. 1 the stationary support 12 includes pillars that are floor mounted. In FIGS. 6 and 7, the conveying apparatus 10 is mounted from an elevated support such as a ceiling.

The conveying apparatus 10 includes an excited frame means 13 having an elongated frame 14 generally extending in an intended direction of movement of particulate material from a rear end 17 to a front end 16. The excited frame 14 is preferably rather lightweight and includes side channels 19 and 20 that extend between the front and rear end 16, 17. Cross braces 22 (FIG. 2) extend between the side channels 19 and 20 to provide a rather rigid frame structure.

The elongated frame 14 includes front feet 23 and rear feet 24 for supporting the apparatus on resilient support means that are in turn fixed or supported on the stationary base 12. In a preferred embodiment the resilient support means includes pneumatic spring mounts and more preferable low profile air/rubber mounts 26 adjacent the front end and air/rubber mounts 28 adjacent the rear ends to support the apparatus both for and aft. The air/rubber mounts 26, 28 may be referred to as cushions for principally absorbing vertical vibratory forces. Satisfactory air/rubber mounts may be purchased from Barry Wright Corp. under the trademark "Stabl-Levl". The air/rubber mounts 26, 28 would not be considered as vertically stationary springs as suggested in the Long et al U.S. Pat. No. 2,951,581. The applicant's apparatus is principally designed to minimize both longitudinal and vertical forces being transmitted from the excited frame to the base 12. The applicant has found that it is not necessary to provide vertically rigid leaf or beam spring mounts for supporting the excited frame 14.

The apparatus 10 further includes an elongated conveyor member 30 that extends between a front end 32 and a rear end 33. The member 30 includes a conveying bed 34 for receiving the particulate material. The bed 34 includes side walls 35 that extend between the front end 32 and the rear end 33. The bed 34 includes a floor wall 36 for principally supporting the material as it is being conveyed from the rear end 33 to the front end 32. The side walls 35 project into side rails 38 that extend downward below the floor 36. A conveyor member frame 48 (FIGS. 2 and 5) is fixed between the side rails 38 to provide rigidity and support to the floor 36. It should be noted that the conveying member 30 has a very simple design and is rather lightweight in structure. The conveying member 30 may be considered as a rather rigid lightweight structure.

The conveying apparatus 10 further includes a second resilient support that resiliently supports the conveyor member 30 on the excited frame 14. The second resilient support is composed of leaf or beam spring means generally designated with the numeral 53 that comprises a plurality of beam spring assemblies 54 that are spaced longitudinally along both sides of the conveying member 30 to enable the conveying member 30 to vibrate in a generally for and aft reciprocating motion with respect to the excited frame 14. Each beam spring assembly 54 includes a pair of beam springs 56 and 57 (FIG. 4) that extend between the conveyor member 30 and the excited frame 14. Each spring 56, 57 is mounted at a slight inclined angle with respect to the longitudinal direction of conveying as illustrated in FIG. 4. The beam spring assemblies 54 prevent transverse movement of the conveyor member 30 with respect to the excited frame 14. The actual path of reciprocating movement between the conveyor member and the excited frame 14 is in the nature of parallelogram arc, but for small displacements or vibrations along this path, the path may be considered as a straight line which is perpendicular to the face of the springs in their undeflected position.

The beam springs 56 and 57 are fixed at their upper ends to opposite sides of an upper block 59 and at their lower ends to a lower block 60. The upper block 59 is secured to the conveyor frame 49 and the side rails 38 by transverse bolts 61. The lower block 60 is secured to the side channels 18 and 19 with similar bolts 61. Shims 63 are positioned on both sides of the beam springs 56 and 57. Clamping plates 64 are secured on opposite sides of the shims 63 to hold the ends of the beam springs 56, 57 to the respective upper block 59 and lower block 60. The size of the beam spring 56, 57 may be varied to adjust their spring constants.

The excited frame means 13 further includes a vibratory drive means 70 that is mounted to the elongated frame 14 for vibrating the elongated frame 14 in the intended direction of conveying. Specifically the vibratroy drive means 70, in a preferred embodiment, includes a balanced counter rotating vibrator 71 that produces a vibratory motion along a linear line of force 76. The vibrator 71 includes a vibrating section 72 that includes one counter rotating element (not shown) for rotation about an eccentric axis 73 (FIGS. 2 and 5). The vibrator 71 is provided with a second section 74 that contains an eccentric element (not shown) that rotates counter to and balanced in opposition with the first eccentric element for rotation about an eccentric axis 75 spaced from and parallel with axis 73. The line of linear force 76 is perpendicular to a plane 77 (FIG. 3) containing the parallel eccentric axes 73 and 75.

The excited frame means 13 further includes a mounting means 78 for mounting the vibratory drive means 70 so that the vibratory line of force 76 is perpendicular to the face of the beam springs 56, 57 and additionally extends through a center of mass of the apparatus (FIGS. 2 and 3).

The mounting means 78 includes side brackets 80 and 81 that extend downwardly below the side channels 19 and 20 adjacent the rear end 17. A cross bracket 82 extending between the side brackets 80 and 81 provides a mounting face 84 for receiving the vibratory drive means 70 to properly position and orient the vibratory drive means 70 with respect to the center of masses and beam springs.

The elongated conveyor means 30 has a known weight and a known center of mass 90 (FIGS. 2 & 3). For purposes of this invention the center of mass 90 includes one-half of the weight of the beam spring assemblies 54. When the bed 34 is loaded with material, the center of gravity of the loaded conveyor means 30 is slightly raised or changed to a loaded center of mass 91 illustrated schematically in FIG. 3.

The excited frame means 13 has a known weight and center of mass 93 (FIGS. 2 and 3). The center of mass 93 of the excited frame means 13 is calculated considering the elongated frame 14, the vibratory drive means 70, the mounting means 78 and one-half of the beam spring assemblies 54. The calculation of the center of mass 93 for the excited frame means 13 does not include the resilient support means 25. The entire apparatus 10, excluding the resilient support means 25, has a center of mass 95 that is intermediate and along a line extending through the center of mass 90 of conveying member 30 and center of mass 93 of the excited frame means (FIGS. 2 and 3). The applicant has found that the rocking of the conveyor means 30 with respect to the excited frame means 13 is greatly reduced when the vibratory line of force 76 extends through the center of mass 95 of the apparatus 10.

Additionally in a preferred embodiment, the line between the center of masses 90 and 93 should be perpendicular to the face of the beam springs 56 and 57 and should be coincident with the vibratory line of force 76 and extend through the center of mass 90, center of mass 93 and the center of mass 95.

The applicant has found that such alignment and positioning of the vibratory drive means 70 greatly reduces the rocking motion of the conveyor member 30 with respect to the excited frame means 13. Consequently, the apparatus is able to operate over a rather large range of loads without any appreciable vibration of the excited frame means 13.

The applicant has found that such a system can utilize "floating" mounts 26 and 28 without transmitting any substantial horizontal or vertical force into the base or stationary structure 12.

FIG. 3 is a schematic diagram of the orientation of the beam springs 56, 57, the vibratory line of force 76 and the centers of gravity 90, 93 and 95. The applicant has found that it is ideal to have the vibration line of force 76 perpendicular to the beam springs 56 and 57 and extending through the center of masses 90, 93 and 95. However, it is very difficult to always attain such alignment particularly when the product load varies. The applicant has found that good results can be achieved if the center of mass 90, 91 of the conveying member 30 is at a distance from the vibration line of force 76 of less than 10% of the distance between the center of mass 90 and the center of mass 93. For example, if the distance between the center of mass 90 and the center of mass 93 is twenty inches, than the offset distance between the center of mass 90 and the line 76 should be less than two inches.

Applicant has also found that the versatility of the apparatus is enhanced when the weight of the excited frame means 13 is between 1.5 and 3.5 times the weight of the conveyor member 30. Preferably the ratio of the weight of the excited frame means 13 and the conveyor member 30 should be between 2.5 and 3.5. For example if the weight of the conveyor member is 350 lbs., the excited frame means should be between 850 lbs. and 1,250 lbs.

Additionally applicant has found that improved results may be obtained when the mounts 26, 28 are mounted equal distance in a horizontal direction from the center of mass 95 of the assembly. Such feature additionally decreases rocking motion of the ends 32 and 33 and also decreases rolling motion.

During the operation of the apparatus 10, the conveyor member 30 is vibrated near its natural frequency with the material progressively moving from the rear end 33 to the front end 32. Because of the vibratory movement of the particulate material, the applicant has found that only approximately one-third of the weight of the particulate material should be included in the calculations of the loaded center of mass 91 of the elongated conveyor means 30. Consequently, the center of mass 91 is calculated by utilizing the weight and distribution of the conveyor means 30 and one-half of the weight of the spring assemblies 94 and approximately one-third of the design or maximum particulate material load.

Additionally, the applicant has found that, with the alignment of the vibratory drive means 70 with respect to the center of masses, the stroke of the conveying member may be easily controlled by the rpm of the vibratory drive 70. Consequently it is relatively easy to adjust the stroke of the apparatus merely by changing the speed of rotation of the vibratory drive means 70.

FIGS. 1-5 illustrate a floor mounted arrangement. FIGS. 6-7 show an elevated or ceiling mounted arrangement in which the air/rubber mounts 26, 28 are supported on a bracket 101 that is suspended from a rod 102. Consequently, the applicant's invention is quite versatile because of its ability to accurately and efficiently convey the particulate material without transmitting any appreciable vibration to the stationary supporting structure.

These and other embodiments may be readily devised by those skilled in the art without deviating therefrom. Therefore, only the following claims are intended to define or limit the applicant's invention.

What is claimed is:

1. An excited frame, vibratory conveying apparatus for moving particulate material, comprising:
   an excited frame means having an elongated frame extending in an intended conveying direction defining a first part of an assembly;
   said excited frame means having a known center of mass;
   an elongated conveying member supported on the elongated frame and extending in the intended conveying direction and defining a second part of the assembly for receiving particulate material at one end and conveying the particulate material in a forward direction to an opposite end;
   said elongated conveying member having a known center of mass;
   first supporting means for resiliently supporting the conveying member on the excited frame means and defining a third part of the assembly to enable the elongated conveying member to reciprocate in the intended conveying direction with respect to the elongated frame;
   said first supporting means comprising a plurality of springs connected to and extending between the elongated frame and the conveying member for resiliently supporting the conveying member on the elongated frame to enable the conveying member on the elongated frame to enable the conveying member to reciprocate in a prescribed path in the intended conveying direction with the conveying member forward and upward in a forward stroke and rearward and downward in a rearward stroke with respect to the excited frame means;
   said springs having a known spring constant and wherein said assembly has a known weight and center of mass;
   a second supporting means for resiliently supporting the excited frame means;
   said excited frame means having a directional vibratory drive means mounted thereon and directly connected to the elongated frame in which the directional vibratory drive means produces vibrating motion along a linear line of force for directly vibrating the elongated frame at a desired frequency relating to the weight of the assembly and spring constant;
   said excited frame means having a mounting means mounting the vibratory drive means on the elongated frame with the linear line of force extending colinearly through the center of masses of the excited frame means and the conveying member and parallel with the prescribed reciprocating path of the conveying member to minimize rocking motion of the conveying element about its center of mass; and
   said vibratory drive means being mounted along the line of force spaced from the center of mass of the assembly.

2. The vibratory conveying apparatus as defined in claim 1 wherein the excited frame means and the conveying member have known weights and wherein the ratio of the weight of the excited frame means to the weight of the conveying member is between 1.5 and 3.5.

3. The vibratory conveying apparatus as defined in claim 1 wherein the second supporting means includes a plurality of spaced resilient frame mounts in which the mounts are horizontally equally spaced from the center of mass of the assembly.

4. The vibratory conveying apparatus as defined in claim 2 wherein the ratio of the weight of the excited frame means to the weight of the conveying member is between 2.5 and 3.5.

5. The vibratory conveying apparatus as defined in claim 1 wherein the first supporting means comprises a plurality of parallel beam springs in which each of the beam springs is inclined and faces the intended conveying direction and wherein the linear line of force extends normal to the parallel beam springs.

* * * * *